US012347609B2

(12) United States Patent
Chen

(10) Patent No.: US 12,347,609 B2
(45) Date of Patent: Jul. 1, 2025

(54) INDUCTOR FRAMEWORK, INDUCTOR DEVICE AND LAMP

(71) Applicants: OPPLE LIGHTING CO., LTD., Shanghai (CN); SUZHOU OPPLE LIGHTING CO., LTD., Suzhou (CN)

(72) Inventor: Feng Chen, Suzhou (CN)

(73) Assignees: OPPLE LIGHTING CO., LTD., Shanghai (CN); SUZHOU OPPLE LIGHTING CO., LTD., Suzhou (CN)

( * ) Notice: Subject to any disclaimer, the term of this patent is extended or adjusted under 35 U.S.C. 154(b) by 838 days.

(21) Appl. No.: 17/565,308

(22) Filed: Dec. 29, 2021

(65) Prior Publication Data

US 2022/0122764 A1 Apr. 21, 2022

Related U.S. Application Data

(63) Continuation of application No. PCT/CN2020/115510, filed on Sep. 16, 2020.

(30) Foreign Application Priority Data

Sep. 24, 2019 (CN) ......................... 201910906703.3
Sep. 24, 2019 (CN) ......................... 201921599871.4

(51) Int. Cl.
*H01F 27/30* (2006.01)
*H01F 27/06* (2006.01)
(Continued)

(52) U.S. Cl.
CPC ........... *H01F 27/306* (2013.01); *H01F 27/06* (2013.01); *H01F 27/24* (2013.01); *H01F 27/2823* (2013.01); *H01F 2027/065* (2013.01)

(58) Field of Classification Search
CPC ........ H01F 27/306; H01F 27/06; H01F 27/24; H01F 27/2823; H01F 2027/065; H01F 27/235
See application file for complete search history.

(56) References Cited

U.S. PATENT DOCUMENTS 6,157,283 A 12/2000 Tsunemi
7,378,932 B1 * 5/2008 Crow .................... H01F 27/325 336/212
(Continued)

FOREIGN PATENT DOCUMENTS

CN 1220472 A 6/1999
CN 1655298 A 8/2005
(Continued)

OTHER PUBLICATIONS

International Search Report of PCT Application No. PCT/CN2020/115510 dated Dec. 16, 2020 with English translation, (6p).

*Primary Examiner* — Malcolm Barnes
(74) *Attorney, Agent, or Firm* — Arch & Lake LLP; Shen Wang; Hao Tan

(57) ABSTRACT

The present disclosure discloses an inductor framework, an inductor device and a lamp. The inductor framework includes a main winding part and at least two conductive welding components; the main winding is configured to fix a winding and has a connection surface, the conductive welding components are under the connection surface and cover the connection surface, and the conductive welding components are in fixed connection with the main winding part and the at least two conductive welding components are insulated from each other; the conductive welding components have a wire accommodation region.

19 Claims, 14 Drawing Sheets

(51) Int. Cl.
*H01F 27/24* (2006.01)
*H01F 27/28* (2006.01)

(56) References Cited

U.S. PATENT DOCUMENTS

| | | | | |
|---|---|---|---|---|
| 7,397,338 | B2 | 7/2008 | Sano et al. | |
| 9,396,865 | B1 * | 7/2016 | Folker | H01F 5/04 |
| 11,557,418 | B2 * | 1/2023 | Suzuki | H02K 5/04 |
| 2007/0188281 | A1 * | 8/2007 | Iguchi | H05K 3/3426 335/299 |
| 2007/0216512 | A1 * | 9/2007 | Sano | H01F 17/043 336/212 |
| 2008/0024263 | A1 * | 1/2008 | Fang | H01F 17/04 336/208 |
| 2013/0099884 | A1 * | 4/2013 | Liang | H01F 27/292 336/83 |
| 2013/0186995 | A1 * | 7/2013 | Yamaguchi | H01F 17/045 242/432.6 |
| 2018/0249539 | A1 * | 8/2018 | Saccavini | H02J 50/90 |

FOREIGN PATENT DOCUMENTS

| | | | | | |
|---|---|---|---|---|---|
| CN | 101038815 | A | | 9/2007 | |
| CN | 101106014 | A | | 1/2008 | |
| CN | 103310947 | A | | 9/2013 | |
| CN | 108511168 | A | * | 9/2018 | H01F 27/266 |
| CN | 110517868 | A | | 11/2019 | |
| CN | 210272031 | U | | 4/2020 | |
| JP | H09148148 | A | | 6/1997 | |
| JP | 2001274023 | A | * | 10/2001 | |
| JP | 2011165706 | A | * | 8/2011 | |
| JP | 4791270 | B2 | * | 10/2011 | |
| WO | WO-2017148228 | A1 | * | 9/2017 | |

* cited by examiner

INDUCTOR FRAMEWORK, INDUCTOR DEVICE AND LAMP

CROSS-REFERENCE TO RELATED APPLICATIONS

This application is based upon and claims the priority of PCT patent application No. PCT/CN2020/115510 filed on Sep. 16, 2020 which claims priority to the Chinese patent application No. 201910906703.3 filed on Sep. 24, 2019, and the Chinese patent application No. 201921599871.4 filed on Sep. 24, 2019, the entire contents of which are hereby incorporated by reference herein for all purposes.

TECHNICAL FIELD

The present disclosure relates to the technical field of inductor manufacture, especially to an inductor framework, an inductor device and a lamp.

BACKGROUND

An inductor is an element able to convert electric energy into magnetic energy to store the magnetic energy, and is widely applied in various electronic products in many fields such as aerospace, signal communication and household electric appliances, and the like. The inductor consists generally of a framework, windings, a shielding case, packaging materials, magnetic cores, iron cores, and the like.

SUMMARY

The present disclosure provides an inductor framework, an inductor device and a lamp.

In a first aspect, at least one example of the present disclosure provides an inductor framework. The inductor framework may include a main winding part and at least two conductive welding components; the main winding may be configured to fix a winding and may have a connection surface facing downward, the conductive welding components may be under the connection surface and at least partly cover the connection surface, and the conductive welding components may be in fixed connection with the main winding part and the at least two conductive welding components may be insulated from each other; and side surface of the conductive welding components away from the connection surface may be a welding bonding surface, and the conductive welding components may have a wire accommodation region, and the wire accommodation region may be configured that a wire of the winding may not extend beyond the welding bonding surface in a case where the wire of the winding is accommodated in the wire accommodation region.

In a second aspect, at least one example of the present disclosure provides an inductor device. The inductor device may include a winding and the inductor framework as described above; and the winding may be constituted by winding a wire with an insulating sheath, may have an input wire and an output wire, and the winding may be fixed on the main winding part, and the input wire and the output wire may be respectively accommodated in the wire accommodation region of two of the at least two conductive welding components insulated from each other.

In a third aspect, at least one example of the present disclosure provides a lamp. The lamp may include a lamp body, a light source module and a driver module; the light source module and the driver module are both provided on the lamp body and electrically connected to each other, the driver module comprises a circuit board, and the inductor device as described above.

It is to be understood that both the foregoing general description and the following detailed description are exemplary and explanatory only and are not restrictive of the present disclosure.

BRIEF DESCRIPTION OF THE DRAWINGS

The drawings described herein are used to provide a further understanding of the present disclosure and constitute a part of the present disclosure. The illustrative examples of the present disclosure and the description thereof are used to explain the present disclosure, and do not constitute an improper limitation of the present disclosure. In the drawings.

DETAILED DESCRIPTION

Figure 1:
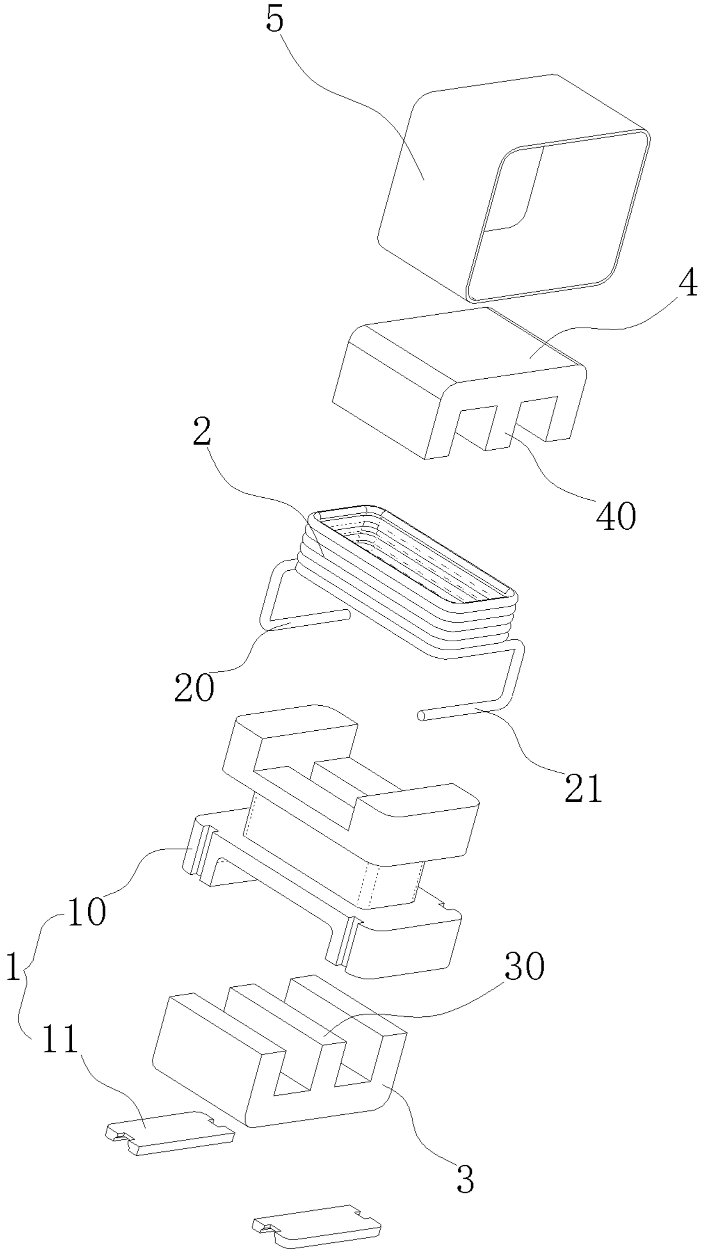
FIG. 1 is an exploded structural view of a vertical inductor device provided in an example of the present disclosure.

For purposes, technical schemes and advantages of the present disclosure to be clearer, the technical schemes of the present disclosure will be clearly and completely described below in combination with examples of the present disclosure and corresponding drawings. It is obvious that the described examples are only a part of the examples of the present disclosure, but not all of the examples. Based on the examples of the present disclosure, all other examples obtained by those skilled in the art without creative work done, belong to the protection scope of the present disclosure.

Reference numbers in this disclosure may include:

1—inductor framework
10—main winding part
100—main winding groove
101—main winding post
101*a*—insertion hole
102—first end plate
102*a*—first embedding part
103—second end plate
103*a*—second embedding part
104—limit groove
105—area extension part
106—connection surface
107—separation boss
108—receiving cavity
11—conductive welding component
110—welding bonding surface
111—wire accommodation region/wire groove
110*a*—notch
110*b*—groove bottom
112—wire passage channel
2—winding
20—input wire
21—output wire
3—first magnetic core
30—center column
4—second magnetic core
40—center column
5—tape
6—annular magnetic core With the development of patch type assembly technology, more and more electronic devices have experienced adaptability improvements to adapt to the patch assembly process, and inductor devices applicable to patch assembly technology also appeared one after another. Sometimes, these inductor devices may use a winding post protruding from sides of an inductor framework and a wire head of the inductor is wound on the winding post to form a welding winding. The welding winding can be directly bonded and welded with a bonding pad on a circuit board, so as to complete the fixation and electrical connection between the inductor device and the circuit board.

The patch type assembly of the inductor device and the circuit board can be achieved by the above methods, but in order to further enhance the product competitiveness, it is necessary to make a further miniaturized improvement of the inductor device.

In the examples of the present disclosure is disclosed an inductor device which can be applied in various lighting lamp products, such as LED lighting products, for example, downlights, bulbs, lighting modules, ceiling lamps, street lamps, and mining lamps, etc. In addition, the inductor device can be applied in other products in the electronic field. A lamp product usually includes a lamp body, a light source module and a driver module, the light source module and the driver module are both provided on the lamp body and electrically connected to each other. The light source module is configured to emit illumination light, and the driver module is configured to drive the light source module, the driver module includes a circuit board, and the inductor device is provided on the circuit board. As shown in FIGS. 1-15, in addition to an inductor framework 1 and a winding 2, the inductor device may include a first magnetic core 4, a second magnetic core 5 and a reinforcement tape 5.

The inductor framework 1 in the example includes a main winding part 10 and at least two conductive welding components 11, and specifically, the main winding part 10 may be made of an insulation material. The main winding part 10 is configured to fix the winding 2, and the winding 2 may be formed by winding a wire with an insulation sheath such as a flat wire, enameled wire, multi-strand wire, three-layer wire or silk-covered wire. The main winding part 10 further has a downward connection surface 106. Those skilled in the art should understand that the connection surface 106 is originally a surface for connecting a PCB board so that it should be located at the lowest position of the main winding part 10.

As shown in the figures, the conductive welding components 11 are under the connection surface 106 and partly cover the connection surface 106, and are fixedly connected with the main winding part 10. The conductive welding components 11 may be directly connected with the connection surface 106 by means of pasting, hot melting, etc., or may cover (or referred to as "be fixed to") the surface 106 and under the surface 106 by fixedly connecting with other parts of the main winding part 10. Namely, the conductive welding components 11 replace the position of the original connection surface 106 to be connected with the PCB board. All the conductive welding components 11 may be under the connection surface 106. In some examples it may be necessary for the conductive welding components 11 to extend partly beyond a range of projections of the connection surface 106 and the main winding 10 due to a small area of the connection surface 106, but not to usually extend too much beyond the range of the projections of the connection surface 106 and the main winding 10 because some regions under the connection surface 106 can be used. Moreover, usually in the case that it is necessary for an overall area of the conductive welding components 11 to be larger than the area of the original connection surface 106, an area extension parts 105 (FIGS. 5, 8 and 14) with a larger area can be formed on a bottom of the main winding part 10 to expand the area of the connection surface 106, so that it can be ensured that all the conductive welding components 11 can still be under the connection surface 106, which will be exemplified below.

As shown in FIGS. 2, 3, 5, 6, 8, 9, 11, 12, 14 and 15, in the example, a side of the conductive welding components 11 away from the connection surface 106 is a welding bonding surface 110, that is, the surface for bonding and welding with the PCB board. Meanwhile, at least one of the conductive welding components 11 is provided with a wire accommodation region 111, there is a certain requirement for the accommodation region 111 in size in the example, namely, the size of the accommodation region 111 is required that a wire of the winding 2 do not extend beyond the welding bonding surface 110 when the wire of the winding 2 is accommodated within the wire accommodation region 111. The wire accommodation region 111 in the example is a through hole or other structures without extending to the welding bonding surface 110, and in this case the wire accommodation region 111 can adopt any form of structure able to accommodate the wires, which will not cause the wires to extend beyond the welding bonding surface 110.

In addition, the wire accommodation region 111 in the example may be a wire groove provided on the welding bonding surface 110. In this case, in order to control the wires not to extend beyond the welding bonding surface 110, the wire groove 111 (for ease of description, the reference numeral of the wire accommodation region is used below) has a depth at least equal to a diameter of the wire. Compared with the through hole, the wire groove 111 is more convenient for the wire to enter because the wire groove 111 is an open structure, and the wire groove 111 may accommodate tin solder in addition to the wire, thus obtaining a better welding effect. The wire groove 111 can be designed to have a gradual widening structure which is gradual widen from a bottom 111*b* of the groove 111 to an opening 111*a*, for example, an upper opening away from the bottom, of the groove 111, for example, a cross section of the wire groove 111 is gradual widening structures in various possible shapes, such as Semicircle, trapezoid, triangle, trumpet shape, etc. On the one hand, this type of gradual widening structure can lead the wire to the bottom of the groove with a smaller width to position the wire, and on the other hand, can accommodate more tin solder and have a larger solder contact surface to facilitate improving the welding effect. The wire groove 111 may pass across two opposite sides of the corresponding conductive welding component 11, and an extension direction of the wire groove 111 may be designed according to a direction in which the wire of the winding 2 is led out or may be oriented at any direction. The wire passes through the wire groove 11 in cooperation with the extension direction of the wire groove 11.

As shown in FIGS. 1, 2, 3, 10 and 11, it is necessary that an input wire 20 of the winding 2 and an output wire 21 of the winding 2 extend along the main winding part 10 for a certain distance to extend from the main winding part 10 to the wire groove 111. If there is no relatively fixed track or path for this segment of the wire, the wire will move freely, which may cause a lower efficiency of the wiring and even the relaxation and dispersion of the winding 2. Therefore, the main winding part 10 may be provided with a limit groove 104 which extend from the main winding part 10 to the wire groove 111. The wire can extend along the limit groove 104 from the main winding part 10 to the wire groove 111 of the corresponding conductive welding component 11. After the winding operation is completed, this segment of the wire is limited in the limit groove 104 and cannot move freely, thus avoiding the relaxation of the winding 2.

Figure 2:
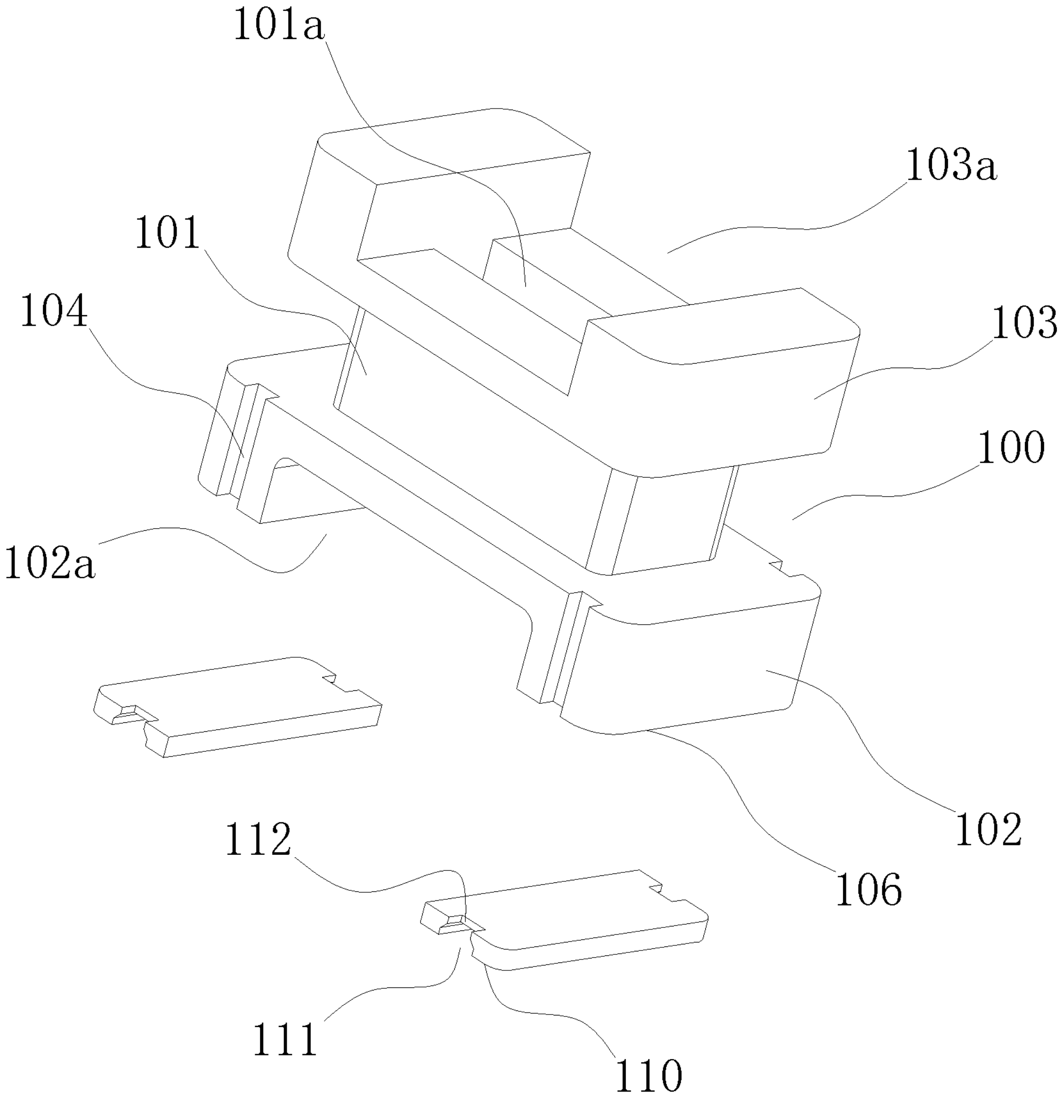
FIG. 2 is a three-dimensional structural view of a vertical inductor framework shown in FIG. 1.
Figure 3:
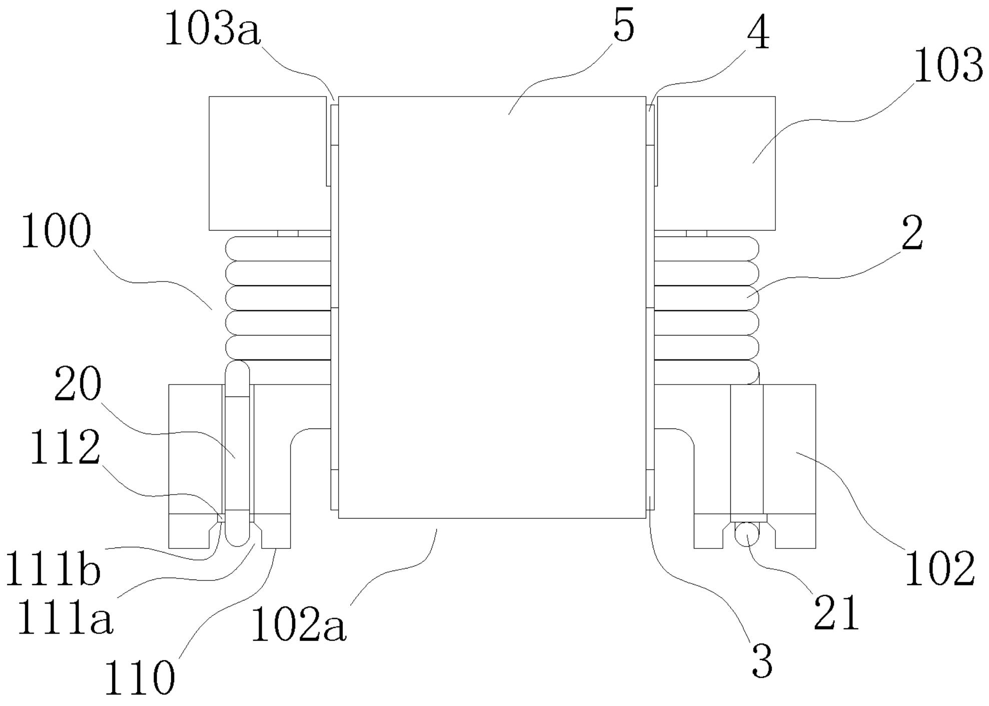
FIG. 3 is a front view of the vertical inductor device shown in FIG. 1.

In some examples, the conductive welding components 11 usually cover the entire region of the connection surface. In this case, the wires need to pass over the upper parts of the conductive welding component 11 through a relatively rapid bend to reach the wire groove 111 located on the welding bonding surface 110. Especially in the case that the conductive welding component 11 is a sheet structure and with a small thicknesses, the wire has a particularly large bending amplitude, which is inconvenient to assembling the wire. Therefore, as shown in FIG. 2 and FIG. 3, in the example each conductive welding components 11 is further provided with a wire passage channel 112 which interconnect the wire groove 111 and the limit groove 104, and the wire passage channel 112 may be a wire passage hole or a notch provided on the corresponding conductive welding component 11.

In the example, the entire inductor device can be welded on the PCB board through the conductive welding components 11 and at the same time the winding 2 can also be connected to a circuit of the PCB board through the conductive welding components 11. It is necessary for a positive terminal and a negative terminal of the winding 2 to be simultaneously connected to the circuit, so that it is required that the positive and negative terminals are respectively connected to the circuit through different conductive welding components 11 in order to prevent a short circuit. Therefore, in the example, at least two of the conductive welding components 11 are insulated from each other when they are provided. The two conductive welding components 11 are respectively used for electrically connecting the input wire 20 and the output wire 21 of the winding 2 so as to smoothly connect the winding 2 to the circuit.

In the examples of the present disclosure, an area occupied by the inductor device is that occupied by the conductive welding components 11, and the conductive welding components 11 can use a part of the area or space under the connection surface 106, so that the area occupied by the inductor device is reduced significantly. Therefore, the area of the occupied circuit board is saved, so that the circuit board has a more compact structure or other necessary components are arranged to reduce costs.

In the example, in order to facilitate the layout, the connection surface 106 may be separated into two portions by a separation band, and at the same time the conductive welding components 11 are also divided into two parts corresponding to the two portions of the connection surface. Each portion of the connection surface 106 is provided with a part of conductive welding components 11, and the conductive welding components 11 located on different portions of the connection surface 106 may be spaced by a long distance to be insulated from each other. The input wire 20 of the winding 2 and the output wire 21 of the winding 2 are respectively electrically connected with the conductive welding components 11 on different sides from two opposite sides, which can be easily performed. The separation band may be an entity, and for example, the connection surface 106 may be truly separated into two portions through a structure such as a groove, a hole or a boss on the connection surface 106. Alternatively, the separation band may be fictional, and the actual connection surface 106 is still an integral structure.

As shown in FIGS. 1-12, in some examples of the present disclosure, the main winding part 10 can have a main winding post 101, a first end plate 102 and a second end plate 103, the main winding post 101 is between the first end plate 102 and the second end plate 103. An edge of the first end plate 102 and an edge of the second end plate 103 are both extend beyond the main winding post 101, and the first end plate 102 and the second end plate 103 together with the main winding post 101 constitute a main winding groove 100, the winding 2 is wound in the main winding groove 100.

The main winding part 10 may be made of a nonmagnetic material, and in order to reduce costs, it is recommended to use phenolic plastic as the material of the main winding part 10. As shown in FIGS. 1-9, the first end plate 102 may be provided with a first embedding part 102*a* configured to be embedded into a first magnetic core 3, and the second end plate 103 can be provided with a second embedding part 103*a* configured to be embedded into a second magnetic core 4. The main winding post 101 can further be provided with a through insertion hole 101*a* which passes through the main winding post 101, and the through insertion hole 101*a* communicates with the first embedding part 102*a* and the second embedding part 103*a*.

In assembly, the first magnetic core 3 is embedded into the first embedding part 102*a*, a part of the first magnetic core 3 extends into the insertion hole 101*a*. For example, the first magnetic core 3 is in a shape of E, a middle extension portion of the shape of E is a center column 30, and the center column 30 extends into the insertion hole 101*a*. At the same time, a part of the second magnetic core 4 is embedded into the second embedding part 103*a*, and another part of the second magnetic core 4 also extends into the insertion hole 101*a*. For example, the second magnetic core 4 also in a shape of E, a middle extension portion of the shape of E is a center column 40, and the center column 40 extends into the insertion hole 101*a*. Extension portions on two sides of the first magnetic core 3 and the second magnetic core 4 are aligned to cover the periphery of the windings 2. In order to fix firmly the first magnetic core 3 and the second magnetic core 4, the reinforcement tape 5 can be wound around peripheries of the first magnetic core 3 and the second magnetic core 4 to fix them.

Based on the above structures, the inductor device can be classified into a vertical inductor device or a horizontal device in accordance with different axis directions of the main winding post 101.

As shown in FIGS. 1-3, for the vertical inductor device, an axis of the main winding post 101 of the inductor framework 1 is vertical to a horizontal plane, the first end plate 102 is located on a bottom of the main winding post 101, and the second end plate 103 is located on a top of the main winding post 103, with a downward side of the first end plate 102 being the connection surface 106. In the case that the vertical inductor device is applied in the above layout, two parts of conductive welding components 11 are respectively provided on two opposite sides under the first end plate 102. As shown in FIG. 2 and FIG. 3, the first embedding part 102*a* may be just used as a marker, so that the connection surface 106 can be separated into two portions using the first embedding part 102*a* as the separation band, and the two parts of conductive welding components 11 can be respectively provided on two sides of the first embedding part 102*a*. The first embedding part 102*a* can be a structure such as a groove to partially separate the connection surface 106 or even completely separate the connection surface 106 into two independent portions. Therefore, in this case, it is only necessary that the two parts of conductive welding components 11 are respectively provided on two sides of the first embedding part 102*a* to use the first embedding part 102*a* as the separation band and an insulation structure, so that the two parts of conductive welding components 11 on the two sides are accordingly insulated from each other. In order to adapt to the conductive welding components 11 with a larger area, a size of the first end plate 102 may be larger as a whole, so that the first end plate 102 has a larger area than the second end plate 103 to bear the conductive welding components 11.

Figure 4:
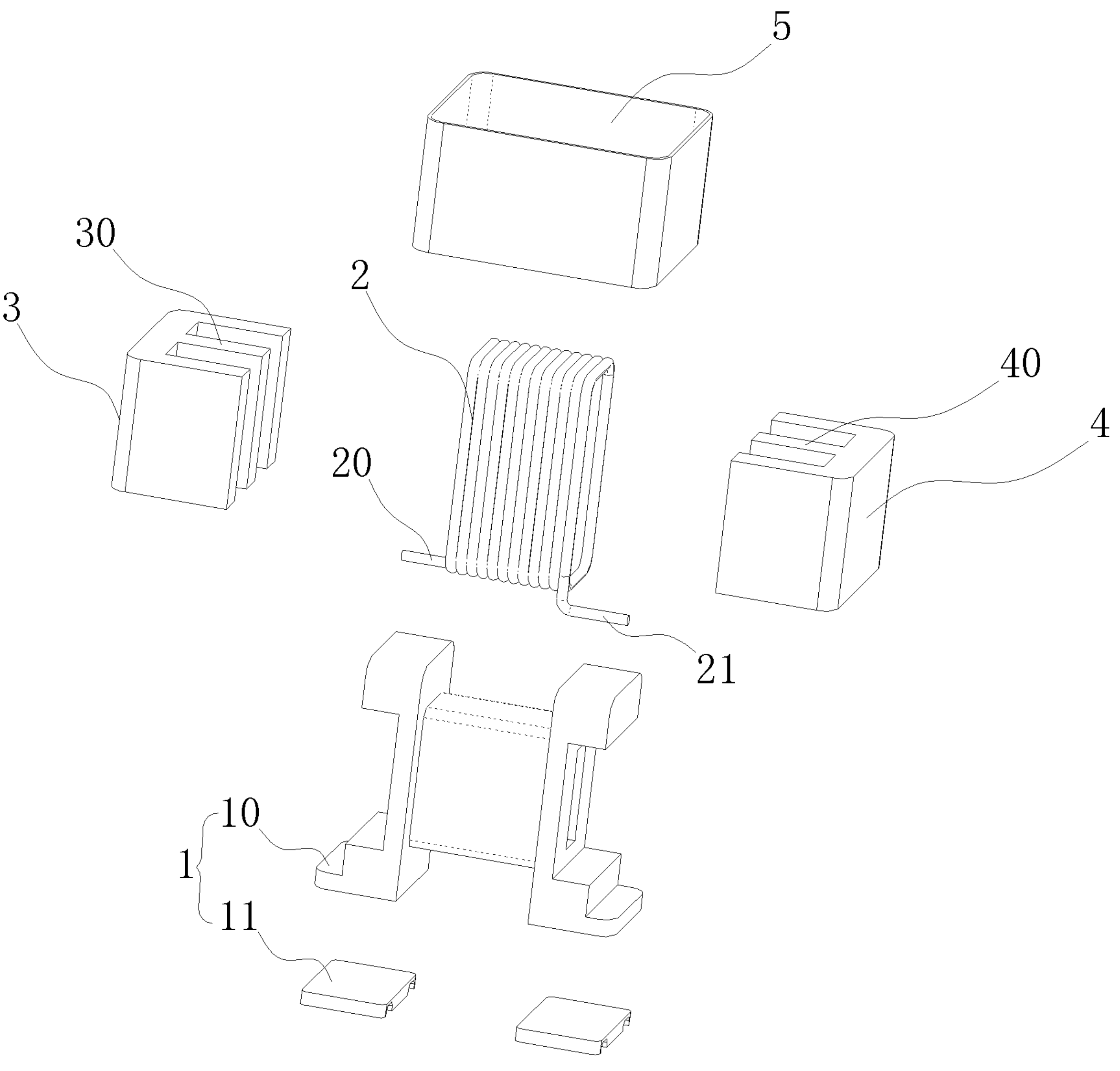
FIG. 4 is an exploded structural view of a horizontal inductor device with a first magnetic core and a second magnetic cored buckled along a horizontal plane, provided in an example of the present disclosure.
Figure 5:
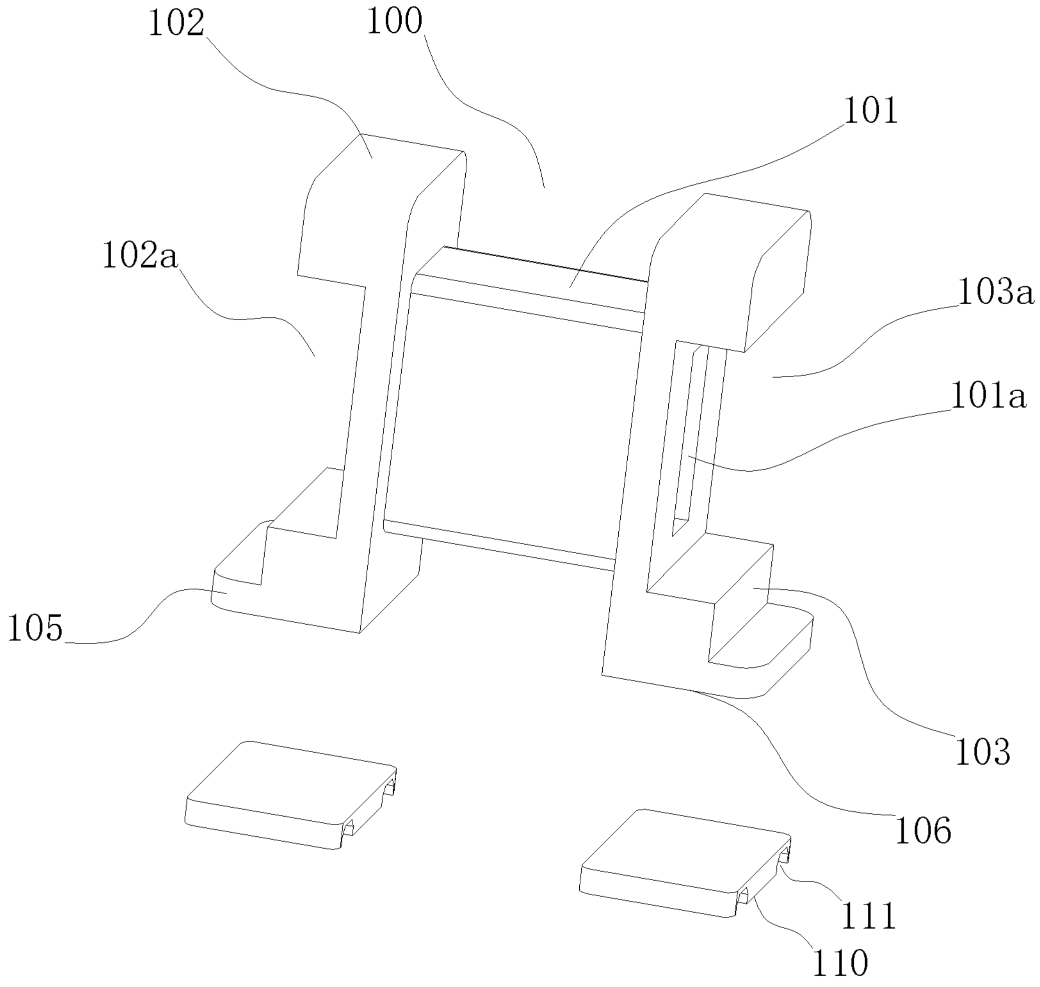
FIG. 5 is a three-dimensional structural view of a horizontal inductor framework shown in FIG. 4.
Figure 6:
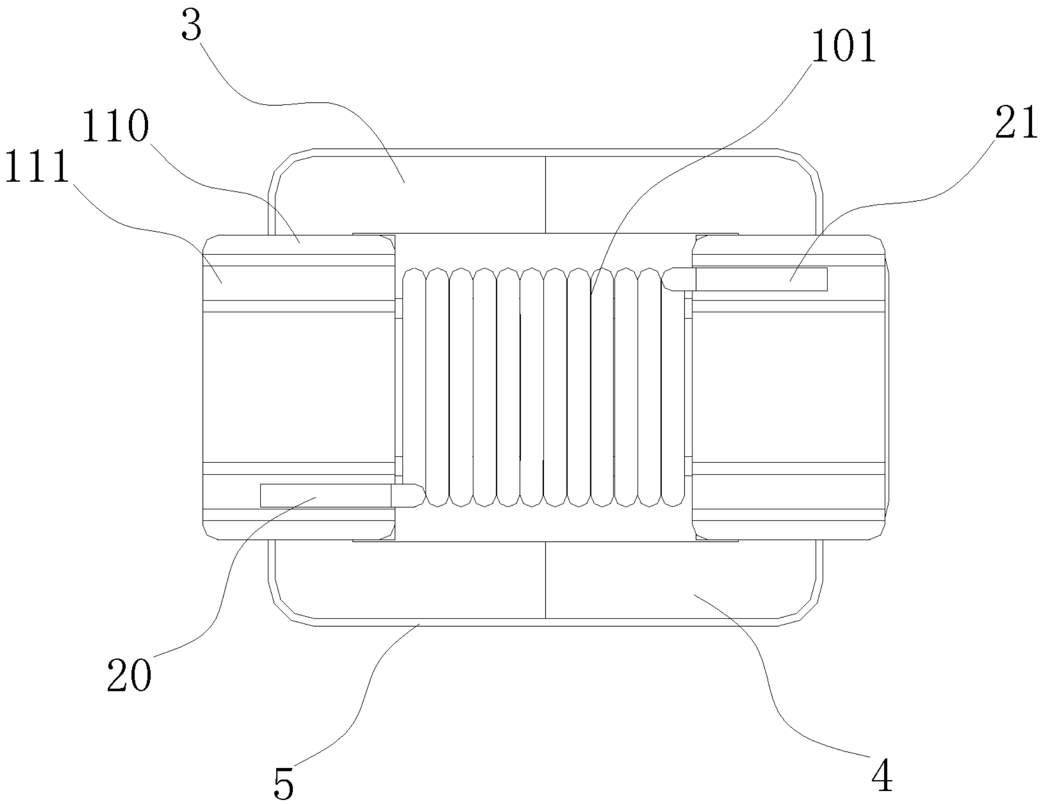
FIG. 6 is a bottom view of the horizontal inductor device shown in FIG. 4.
Figure 7:
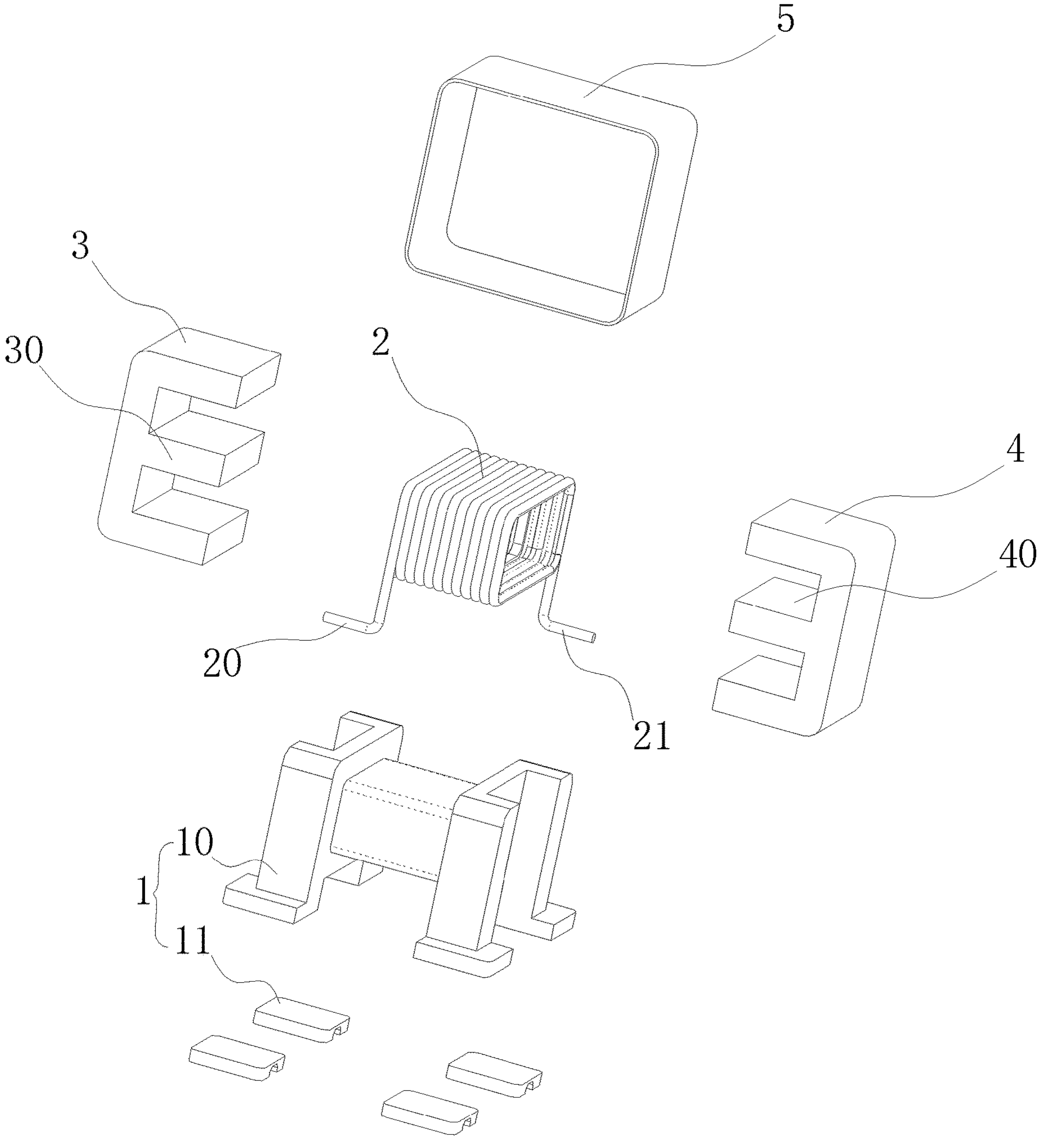
FIG. 7 is an exploded structural view of a horizontal inductor device with a first magnetic core and a second magnetic cored buckled along a vertical plane, provided in an example of the present disclosure.
Figure 8:
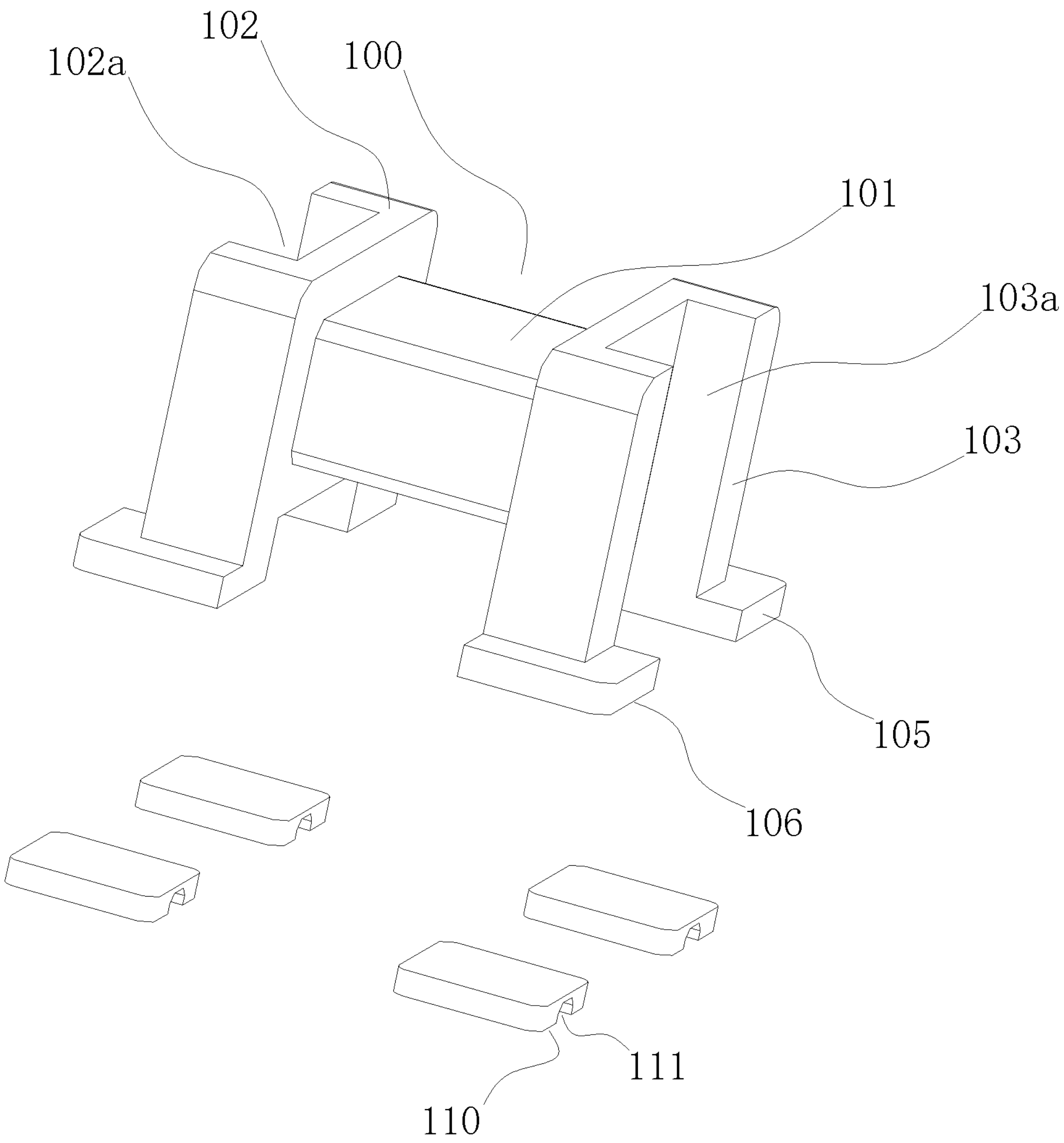
FIG. 8 is a three-dimensional structural view of a horizontal inductor framework shown in FIG. 7.
Figure 9:
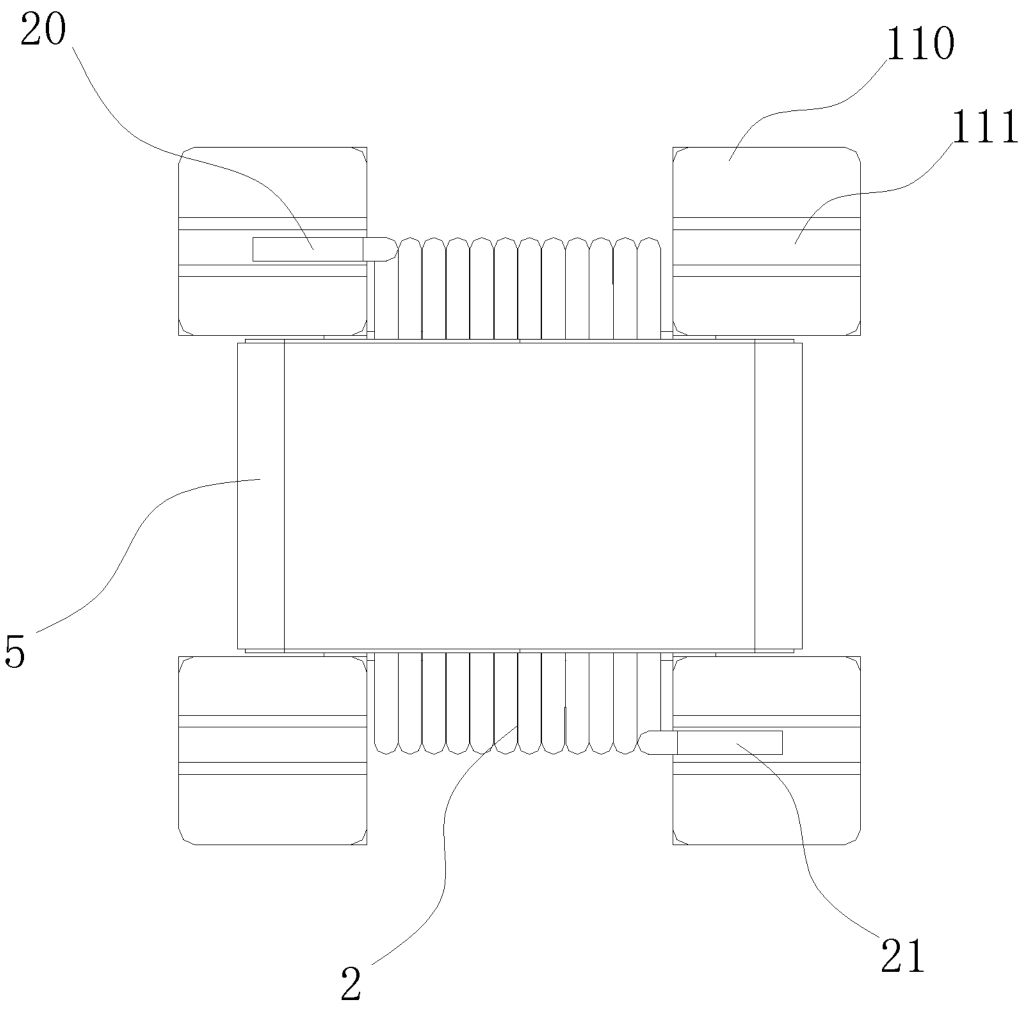
FIG. 9 is a bottom view of the horizontal inductor device shown in FIG. 7.

As shown in FIGS. 4-6, for the horizontal inductor device, an axis of the main winding post 101 is parallel to the horizontal plane, and the first end plate 102 and the second end plate 103 are respectively located on a left side of the main winding post 101 and a right side of the main winding post 101, with a downward side surface of the first end plate 102 and a downward side surface of the second end plate 103 both used as the connection surface 106. The first end plate 102 and the second end plate 103 are separated by the main winding post 101, so that the two portions of the connection surface 106 located respectively on the first end plate 102 and the second end plate 103 themselves are regarded as two independent portions separated by a first separation band. In this case, it is only necessary that one part of conductive welding components 11 is under the first end plate 102 and the other part of conductive welding components 11 is under the second end plate 103, so that the two parts of conductive welding components 11 can be accordingly insulated from each other. In this example, due to limited thicknesses of the first end plate 102 and the second end plate 102, in order to bear the conductive welding components 11 with a large area, the bottom of the first end plate 102 and the bottom of the second end plate 103 are respectively provided with an area extension part 105 to increase the size of the connection surface in the axis direction of the main winding post 101, thus increasing the area of the connection surface.

For some inductor devices, there may be more than one winding 2 wound thereon, and for example, there are two or even more windings 2 wound simultaneously, so that the number of the input wires 20 and the output wires 21 also needs to be doubled. Therefore, more conductive welding components 11 insulated from each other are required. Alternatively, it is necessary for the inductor framework 1 to adapt to different types of windings 2, the input wire 20 and the output wire 21 of each type of winding 2 that are led out have different led out locations, and therefore, for the input wire 20 and the output wire 21 not to need excessively long conveying paths, the conductive welding components 11 are provided at a plurality of angles in the inductor framework 1.

Regardless of the above purposes, the connection surface 106 can be separated into a plurality of portions by a plurality of intersection separation bands, and at the same time, the conductive welding components 11 are also correspondingly divided into a plurality of parts corresponding to the plurality of portions of the connection surface. Each portion of the connection surface 106A is provided respectively with one part of conductive welding components 11, and different parts of the plurality of parts of the conductive welding components 11 are insulated from each other. In this way, there are conductive welding components 11 available in sufficient quantity and orientation, so that the inductor framework 1 has a better versatility.

For the horizontal inductor device, because there are two ways to buckle the first magnetic core 3 and the second magnetic core 4. One way is to buckle them along the horizontal plane (see FIGS. 4-6), without the magnetic cores to pass across the bottom of the main winding part 10. The other way is to buckle them along a vertical plane (see FIGS. 7-9), by which the magnetic cores still need to pass across the bottom of the main winding part 10, so that it is necessary that the first embedding part 102*a* and the second embedding part 103*a* respectively extend to the bottom of the first end plate 102 and the bottom of the second end plate 103. On this basis, the first embedding part 102*a* and the second embedding part 103*a* can be used as a second separation band intersecting the first separation band. The first embedding part 102*a* is one portion of the second separation band and is used to separate the portion of the connection surface 106 on the first end plate 102 into two opposite portions again, and at the same time, the second embedding part 103*a* is the other portion of the second separation band and is used to separate the portion of the connection surface 106 on the second end plate 103 into two opposite portions again. In this case, the connection surface 106 is separated into four portions in total, and each portion of the connection surface 106 is covered with the conductive welding component 11 and the conductive welding component 11 is under the respective portion of the connection surface 106. In this case, due to a small area of each portion of the connection surface 106, each portion of the connection surface 106 is provided with an area extension part 105 which extends beyond the first end plate 102 and the second end plate 103 along both the axis direction of the main winding post 101 and a direction vertical to the axis, so that a larger connection surface can be obtained to bear the conductive welding components 11.

Figure 10:
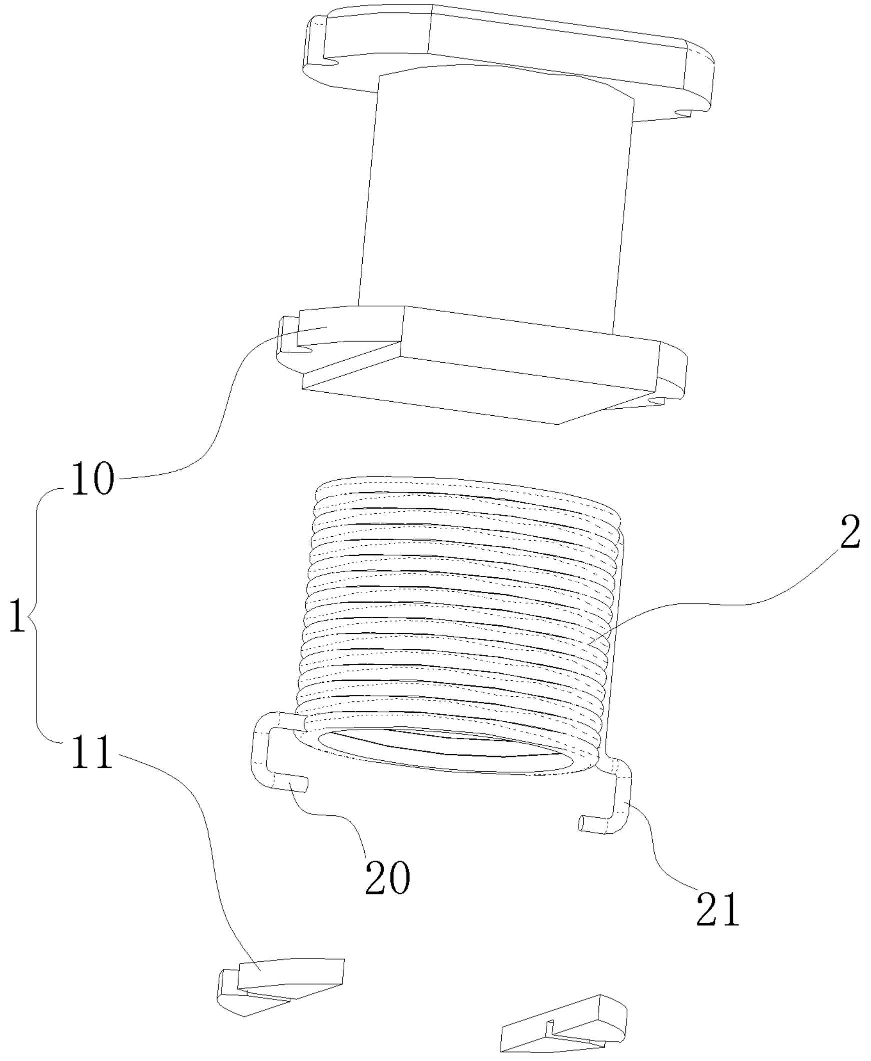
FIG. 10 is an exploded structural view of an inductor device adopting an inductor framework made of magnetic materials, provided in an example of the present disclosure.
Figure 11:
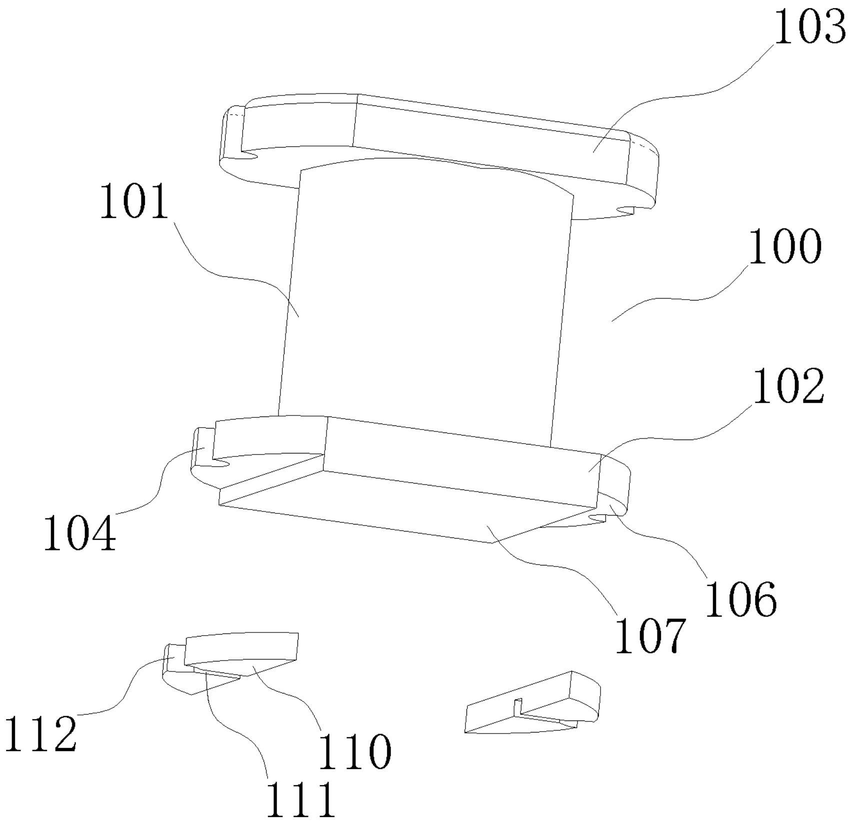
FIG. 11 is a three-dimensional structural view of an inductor framework shown in FIG. 10.
Figure 12:
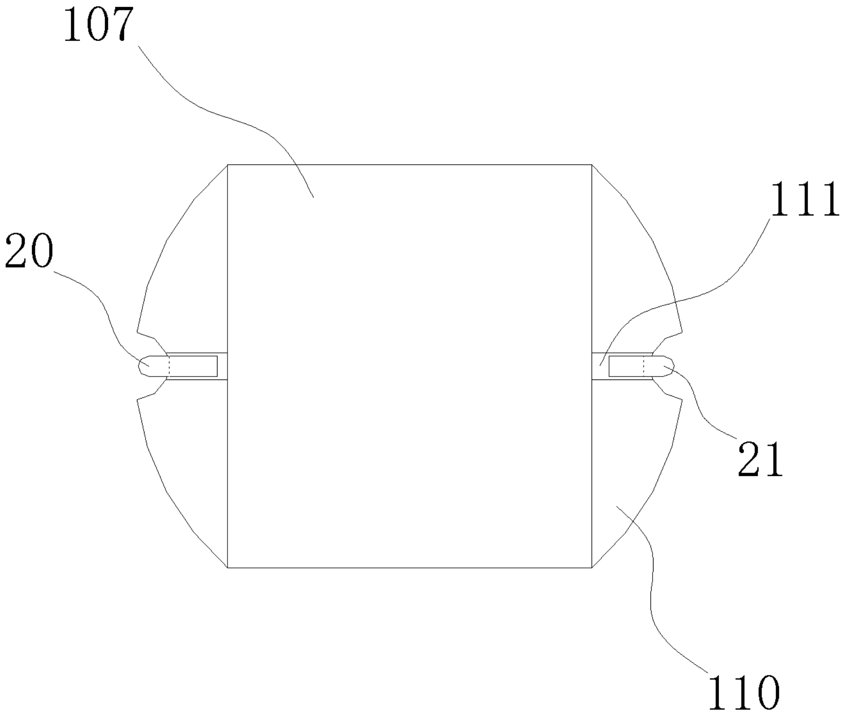
FIG. 12 is a bottom view of the inductor device shown in FIG. 10.

As shown in FIGS. 10-12, the main winding post 10 in the example may be made of a magnetic material, with an additional magnetic core omitted from the whole inductor device. In the case where the axis of the main winding post 101 is vertical to the horizontal plane and the downward side surface of the first end plate 102 is the connection surface 106, the first end plate 102 may be provided with a separation boss 107 protruding downward from a middle portion of the connection surface 106. The separation boss 107 can separate the connection surface 106 into two portions, each portion of the connection surface 106 is provided respectively with one part of conductive welding components 11, so that the conductive welding components 11 located on different portions of the connection surface 106 can be separated accordingly to be insulated from each other. The separation boss 107 cannot protrude from the connection surface 106 too much, in order to ensure that the welding bonding surface 110 extends beyond the separation boss 107 or is flush with the separation boss 107 to meet the welding requirements.

Figure 13:
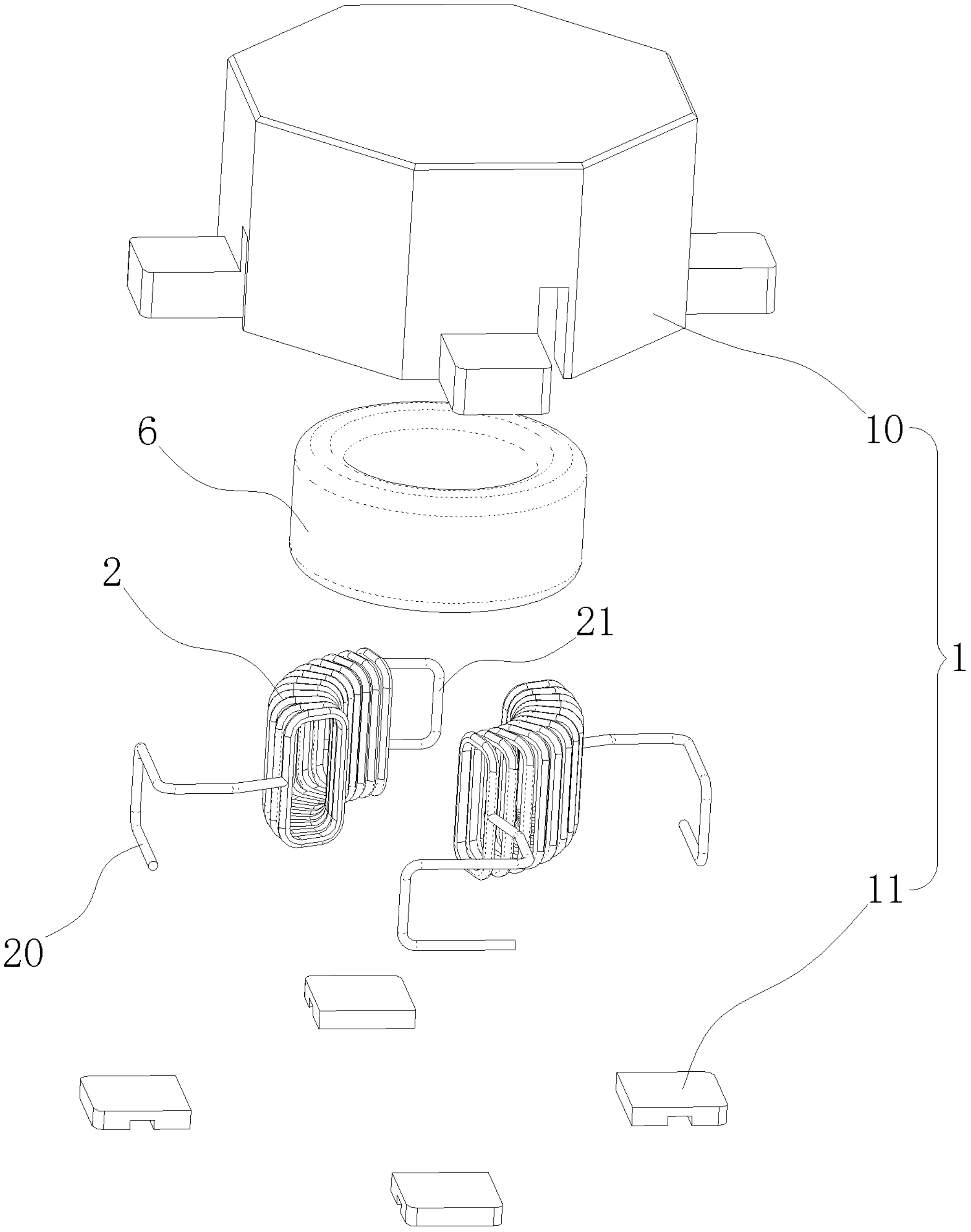
FIG. 13 is an exploded structural view of an inductor device adopting a receiving cavity and an annular magnetic core, provided in an example of the present disclosure.
Figure 14:
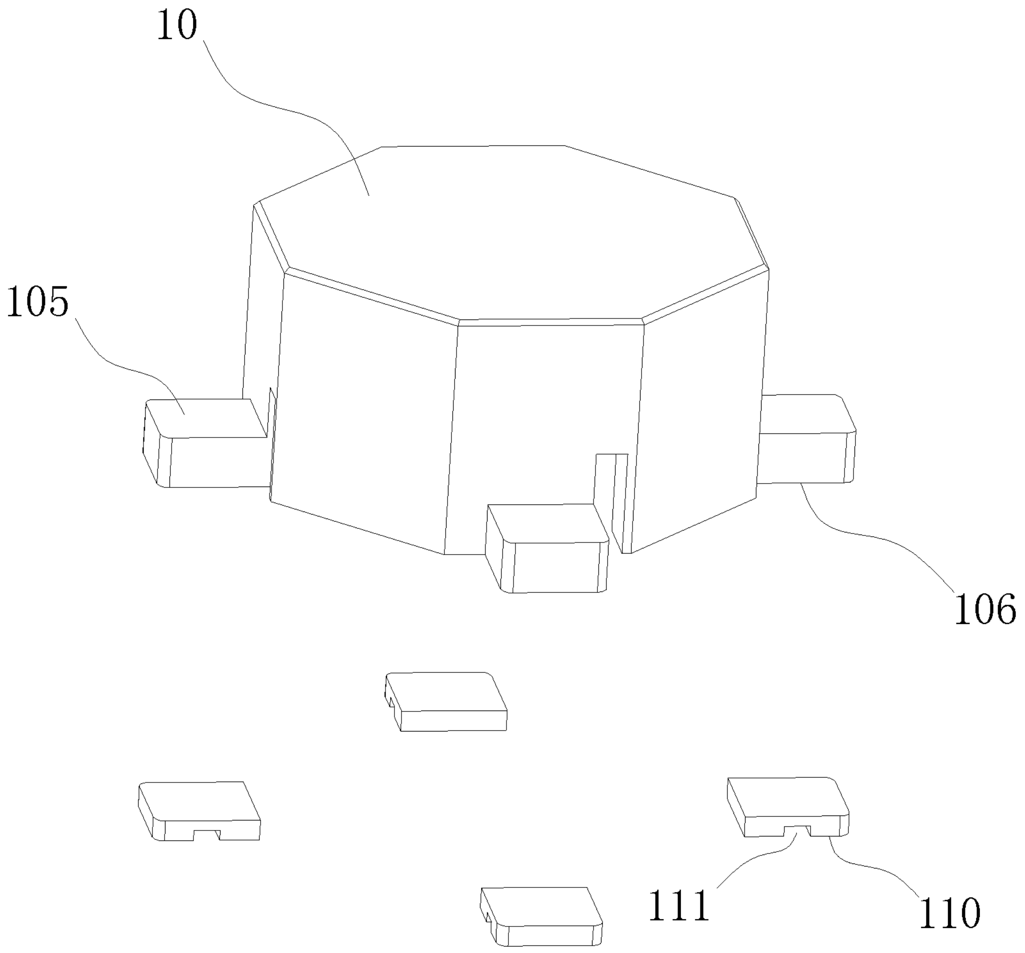
FIG. 14 is a three-dimensional structural view of an inductor framework shown in FIG. 13.
Figure 15:
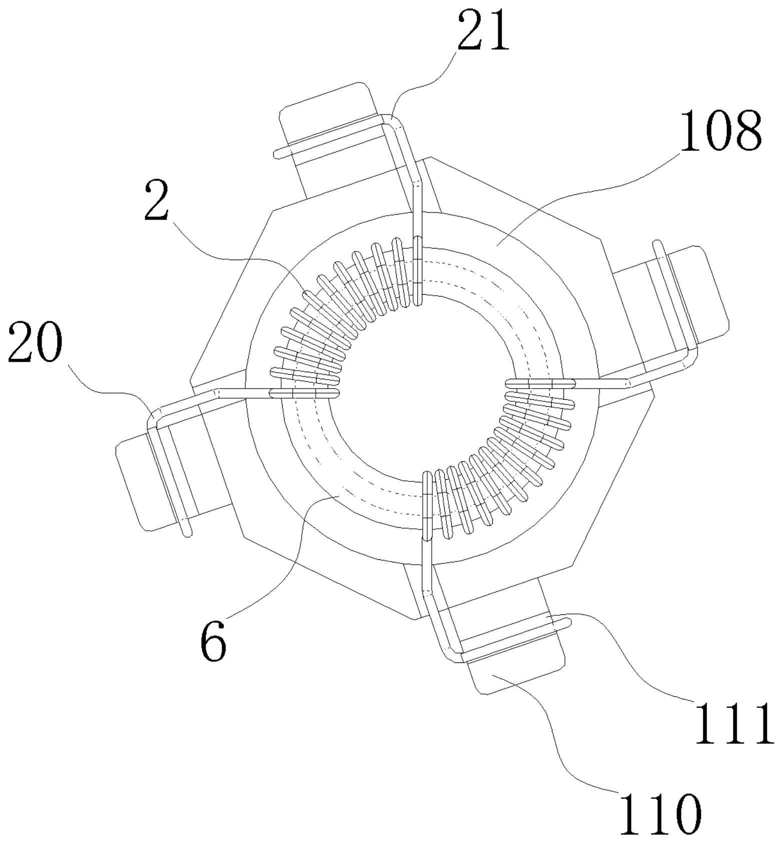
FIG. 15 is a bottom view of the inductor device shown in FIG. 13.

In addition to the above structures, a structure of another inductor device is provided in the examples of the present disclosure. As shown in FIGS. 13-15, the main winding part 10 may have a receiving cavity 108 which is which is recessed inwardly from the connection surface 106 and is configured to fix the winding 2. The conductive welding components 11 are provided on the connection surface 106 around the receiving cavity 108. Meanwhile, the inductor device further includes an annular magnetic core 6, the winding 2 is wound on the annular magnetic core 6, and the annular magnetic core 6 and the winding 2 are then fixed in the receiving cavity 106 together.

On same annular magnetic core 6 can be wound one winding 2 or can also be simultaneously wound a plurality of windings 2. The annular magnetic core 6 and the winding 2 can be fixed in the receiving cavity 108 by means of clamping, gluing, etc. Usually, the receiving cavity 108 has a circular contour, and the main winding part 10 may have an overall outer contour which is a regular quadrangular prism structure, a regular octagonal prism structure or other prismatic structures that use the connection surface 106 as the bottom.

In the example, the connection surface 106 is usually a narrow circle surrounding the receiving cavity 108 and has a limited area, so that the area extension part 105 may be provided at different positions around the receiving cavity 108 to expand the area of the connection surface 106 by referring to the above examples.

Moreover, the main winding part 10 may be made of not only a non-magnetic material but also a magnetic shielding material. In the case where the main winding part 10 is made of the magnetic shielding material, a good magnetic shielding effect can be achieved, thus reducing the magnetic interference of the inductor device on other surrounding components.

In summary, the inductor framework, the inductor device, and the lamp provided in the examples of the present disclosure can greatly reduce the area occupied by the inductor device.

The present disclosure provides an inductor framework, an inductor device and a lamp.

In a first aspect, at least one example of the present disclosure provides an inductor framework, the inductor framework comprises a main winding part and at least two conductive welding components; the main winding is configured to fix a winding and has a connection surface facing downward, the conductive welding components are under the connection surface and at least partly cover the connection surface, and the conductive welding components are in fixed connection with the main winding part and the at least two conductive welding components are insulated from each other; and side surface of the conductive welding components away from the connection surface is a welding bonding surface, and the conductive welding components have a wire accommodation region, and the wire accommodation region is configured that a wire of the winding do not extend beyond the welding bonding surface in a case where the wire of the winding is accommodated in the wire accommodation region.

Optionally, in the above-mentioned inductor framework, the connection surface is separated into two portions by a separation band, and the conductive welding components are divided into two parts corresponding to the two portions of the connection surface, the two parts of the conductive welding components are respectively provided on the two portions of the connection surface, and the different two parts of the conductive welding components are insulated from each other.

Optionally, in the above-mentioned inductor framework, the connection surface is separated into a plurality of portions by a plurality of separation bands intersecting each other, and the conductive welding components are divided correspondingly into a plurality of parts corresponding to the plurality of portions of the connection surface, plurality of parts of the conductive welding components are respectively provided on the plurality of portions of the connection surface in a one-to-one correspondence manner, and different parts of the plurality of parts of the conductive welding components are insulated from each other.

Optionally, in the above-mentioned inductor framework, the main winding part has a main winding post, a first end plate and a second end plate, the main winding part is between the first end plate and the second end plate, both an edge of the first end plate and an edge of the second end plate extend beyond the main winding post, and the first end plate and the second end plate together with the main winding post constitute a main winding groove.

Optionally, in the above-mentioned inductor framework, an axis of the main winding post is vertical to a horizontal plane, and a downward side surface of the first end plate is the connection surface.

Optionally, in the above-mentioned inductor framework, the first end plate is provided with a separation boss which protrudes downward from a middle portion of the connection surface and separates the connection surface into two portions, each portion of the connection surface is provided with one part of the conductive welding components, and the welding bonding surface extend beyond the separation boss or is flush with the separation boss.

Optionally, in the above-mentioned inductor framework, the first end plate is provided with a first embedding part configured to be embedded into a first magnetic core, and the conductive welding components are divided into two parts which are respectively provided on two sides of the first embedding part.

Optionally, in the above-mentioned inductor framework, an axis of the main winding post is parallel to a horizontal plane, and both a downward side surface of the first end plate and a downward side surface of the second end plate are the connection surface, one part of the conductive welding components is under the first end plate, and other part of the conductive welding components is under of the second end plate.

Optionally, in the above-mentioned inductor framework, the first end plate is provided with a first embedding part configured to be embedded into a first magnetic core, the second end plate is provided with a second embedding configured to be embedded into a second magnetic core, the first embedding part separates a part of the connection surface of the first end plate into two opposite portions, and the second embedding part separates a part of the connection surface of the second end plate into two opposite portions; each part of the connection surface is covered with a part of the conductive welding components and the part of the conductive welding components is under the each part of the connection surface.

Optionally, in the above-mentioned inductor framework, the wire accommodation region is a wire groove provided on the welding bonding surface.

Optionally, in the above-mentioned inductor framework, the main winding part has a receiving cavity which is recessed inwardly from the connection surface and is configured to fix the winding, and the conductive welding components surround the receiving cavity.

Optionally, in the above-mentioned inductor framework, the wire accommodation region is a wire groove provided on the welding bonding surface.

Optionally, in the above-mentioned inductor framework, the wire groove is a gradually widening structure which is gradually widen from a bottom of the groove to an opening of the groove.

Optionally, in the above-mentioned inductor framework, the wire groove passes across two opposite sides of the conductive welding components.

Optionally, in the above-mentioned inductor framework, the main winding part is further provided with a limit groove, an end of the limit groove extends into the wire groove.

Optionally, in the above-mentioned inductor framework, the conductive welding components cover an entirety of the connection surface, and the conductive welding components are further provided with a wire passage channel interconnecting the wire groove and the limit groove.

Optionally, in the above-mentioned inductor framework, the wire passage channel is a wire passage hole or a wire passage notch.

Optionally, in the above-mentioned inductor framework, each of the conductive welding components is a sheet structure.

Optionally, in the above-mentioned inductor framework, the conductive welding components is attached to the connecting surface or is hot-melt connected with the connection surface.

Optionally, in the above-mentioned inductor framework, a bottom of the main winding part is provided with an area extension part, and the connection surface is a downward surface of the area extension part.

In a second aspect, at least one example of the present disclosure provides an inductor device, the inductor device comprises a winding and the above-mentioned inductor framework; and the winding is constituted by winding a wire with an insulating sheath, has an input wire and an output wire, and the winding is fixed on the main winding part, and the input wire and the output wire are respectively accommodated in the wire accommodation region of two of the at least two conductive welding components insulated from each other.

Optionally, in the above-mentioned inductor device, in a case where the main winding part has a main winding post, a first end plate and a second end plate, the main winding part is between the first end plate and the second end plate, both an edge of the first end plate and an edge of the second end plate extend beyond the main winding post, and the first end plate and the second end plate together with the main winding post constitute a main winding groove, the winding is wound in the main winding groove.

Optionally, in the above-mentioned inductor device, the main winding part is made of a magnetic material.

Optionally, in the above-mentioned inductor device, the main winding part is made of a nonmagnetic material, and the inductor device further comprises a first magnetic core and a second magnetic core, with the first magnetic core is buckled on the first end plate and the second magnetic core is buckled on the second end plate.

Optionally, in the above-mentioned inductor device, a through insertion hole is provided in the main winding post, the first end plate is provided with a first embedding part configured to be embedded into a magnetic core, and the second end plate is provided with a second embedding part configured to be embedded into a magnetic core, with the insertion hole communicating with the first embedding part and the second embedding part; and the first magnetic core is embedded into the first embedding part and a part of the first magnetic core extends into the insertion hole, and a part of the second magnetic core is embedded into the second embedding part and a part of the second magnetic core extends into the insertion hole.

Optionally, in the above-mentioned inductor device, both the first magnetic core and the second magnetic core are in a shape of E, a middle extension portion of the shape of E is a center column, and the center column of the first magnetic core and the center column of the first magnetic core both extend into the insertion hole.

Optionally, in the above-mentioned inductor device, the wire with an insulation sheath is any one selected from a group consisting of a flat wire, an enameled wire, a multi-strand wire, a three-layer wire and a silk-covered wire.

Optionally, in the above-mentioned inductor device, in a case where the main winding part has a receiving cavity which is recessed inwardly from the connection surface and is configured to fix the winding, and the conductive welding components surround the receiving cavity, the inductor device further comprises an annular magnetic core, the winding is wound on the annular magnetic core, and the annular magnetic core and the winding are both fixed in the receiving cavity.

In a third aspect, at least one example of the present disclosure provides a lamp, the lamp comprises a lamp body, a light source module and a driver module; the light source module and the driver module are both provided on the lamp body and electrically connected to each other, the driver module comprises a circuit board, and the above-mentioned inductor device.

At least one above technical scheme adopted in the examples of the present disclosure can achieve the following beneficial effects:

The inductor framework, the inductor device and the lamp provided in the examples of the present disclosure, can reduce significantly the area occupied by the inductor device, by the connection surface of the main winding part being covered with the conductive welding components, accommodating the wires and being bonded with the circuit board.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above examples of the present disclosure focus on differences between the examples. Different optimization features in the examples can be combined with each other to form a better example, as long as they are not contradictory, which will not be repeated here in consideration of the brevity of the text.

What is described above is only the examples of the present disclosure, but is not used for limiting the present disclosure. For those skilled in the art, there can be various alternations and changes in the present disclosure. Any modification, equivalent replacement, improvement, etc., made within the spirit and principle of the present disclosure should be included in the scope of the present disclosure.

The invention claimed is:

1. An inductor framework, comprising a main winding part and at least two conductive welding components, wherein the main winding part is provided with a limited groove; wherein:

the main winding part is configured to fix a winding and has a connection surface facing downward, the conductive welding components are under the connection surface and at least partly cover the connection surface, and the conductive welding components are in fixed connection with the main winding part and the at least two conductive welding components are insulated from each other; and a side surface of the conductive welding components away from the connection surface is a welding bonding surface, and the conductive welding components have a wire accommodation region, wherein the wire accommodation comprises a wire groove, and the wire accommodation region is configured that a wire of the winding do not extend beyond the welding bonding surface in a case where the wire of the winding is accommodated in the wire accommodation region, wherein an end of the limited groove extends into the wire groove, and the conductive welding components cover an entirety of the connection surface, and the conductive welding components are further provided with a wire passage channel interconnecting the wire groove and the limit groove.

2. The inductor framework according to claim 1, wherein the connection surface is separated into two portions by a separation band, and the conductive welding components are divided into two parts corresponding to the two portions of the connection surface, the two parts of the conductive welding components are respectively provided on the two portions of the connection surface, and the different two parts of the conductive welding components are insulated from each other.

3. The inductor framework according to claim 1, wherein the connection surface is separated into a plurality of portions by a plurality of separation bands intersecting each other, and the conductive welding components are divided correspondingly into a plurality of parts corresponding to the plurality of portions of the connection surface, plurality of parts of the conductive welding components are respectively provided on the plurality of portions of the connection surface in a one-to-one correspondence manner, and different parts of the plurality of parts of the conductive welding components are insulated from each other.

4. The inductor framework according to claim 1, wherein the main winding part has a main winding post, a first end plate and a second end plate, the main winding part is between the first end plate and the second end plate, both an edge of the first end plate and an edge of the second end plate extend beyond the main winding post, and the first end plate and the second end plate together with the main winding post constitute a main winding groove.

5. The inductor framework according to claim 4, wherein an axis of the main winding post is vertical to a horizontal plane, and a downward side surface of the first end plate is the connection surface.

6. The inductor framework according to claim 5, wherein the first end plate is provided with a separation boss which protrudes downward from a middle portion of the connection surface and separates the connection surface into two portions, each portion of the connection surface is provided with one part of the conductive welding components, and the welding bonding surface extend beyond the separation boss or is flush with the separation boss.

7. The inductor framework according to claim 5, wherein the first end plate is provided with a first embedding part configured to be embedded into a first magnetic core, and the conductive welding components are divided into two parts which are respectively provided on two sides of the first embedding part.

8. The inductor framework according to claim 4, wherein an axis of the main winding post is parallel to a horizontal plane, and both a downward side surface of the first end plate and a downward side surface of the second end plate are the connection surface, one part of the conductive welding components is under the first end plate, and other part of the conductive welding components is under of the second end plate.

9. The inductor framework according to claim 8, wherein the first end plate is provided with a first embedding part configured to be embedded into a first magnetic core, the second end plate is provided with a second embedding configured to be embedded into a second magnetic core, the first embedding part separates a part of the connection surface of the first end plate into two opposite portions, and the second embedding part separates a part of the connection surface of the second end plate into two opposite portions; each part of the connection surface is covered with a part of the conductive welding components and the part of the conductive welding components is under the each part of the connection surface.

10. The inductor framework according to claim 1, wherein the main winding part has a receiving cavity which is recessed inwardly from the connection surface and is configured to fix the winding, and the conductive welding components surround the receiving cavity.

11. The inductor framework according to claim 1, wherein the wire groove is provided on the welding bonding surface.

12. The inductor framework according to claim 11, wherein the wire groove is a gradually widening structure which is gradually widen from a bottom of the groove to an opening of the groove, and pass across two opposite sides of the conductive welding components.

13. The inductor framework according to claim 1, wherein:

each of the conductive welding components is a sheet structure;

the conductive welding components is attached to the connecting surface or is hot-melt connected with the connection surface; and a bottom of the main winding part is provided with an area extension part, and the connection surface is a downward surface of the area extension part.

14. An inductor device, comprising a winding and an inductor framework, wherein:

the inductor framework comprises a main winding part and at least two conductive welding components, wherein the main winding part is provided with a limited groove;

the main winding part is configured to fix a winding and has a connection surface facing downward, the conductive welding components are under the connection surface and at least partly cover the connection surface, and the conductive welding components are in fixed connection with the main winding part and the at least two conductive welding components are insulated from each other;

a side surface of the conductive welding components away from the connection surface is a welding bonding surface, and the conductive welding components have a wire accommodation region, wherein the wire accommodation comprises a wire groove, and the wire accommodation region is configured that a wire of the winding do not extend beyond the welding bonding surface in a case where the wire of the winding is accommodated in the wire accommodation region, wherein an end of the limited groove extends into the wire groove, and the conductive welding components cover an entirety of the connection surface, and the conductive welding components are further provided with a wire passage channel interconnecting the wire groove and the limit groove; and the winding is constituted by winding a wire with an insulating sheath, has an input wire and an output wire, and the winding is fixed on the main winding part, and the input wire and the output wire are respectively accommodated in the wire accommodation region of two of the at least two conductive welding components insulated from each other.

15. The inductor device according to claim 14, wherein, in a case where the main winding part has a main winding post, a first end plate and a second end plate, the main winding part is between the first end plate and the second end plate, both an edge of the first end plate and an edge of the second end plate extend beyond the main winding post, and the first end plate and the second end plate together with the main winding post constitute a main winding groove, the winding is wound in the main winding groove.

16. The inductor device according to claim 15, wherein the main winding part is made of a nonmagnetic material, and the inductor device further comprises a first magnetic core and a second magnetic core, with the first magnetic core is buckled on the first end plate and the second magnetic core is buckled on the second end plate.

17. The inductor device according to claim 16, wherein a through insertion hole is provided in the main winding post, the first end plate is provided with a first embedding part configured to be embedded into a magnetic core, and the second end plate is provided with a second embedding part configured to be embedded into a magnetic core, with the insertion hole communicating with the first embedding part and the second embedding part; and the first magnetic core is embedded into the first embedding part and a part of the first magnetic core extends into the insertion hole, and a part of the second magnetic core is embedded into the second embedding part and a part of the second magnetic core extends into the insertion hole.

18. The inductor device according to claim 14, wherein, in a case where the main winding part has a receiving cavity which is recessed inwardly from the connection surface and is configured to fix the winding, and the conductive welding components surround the receiving cavity, the inductor device further comprises an annular magnetic core, the winding is wound on the annular magnetic core, and the annular magnetic core and the winding are both fixed in the receiving cavity.

19. A lamp, comprising a lamp body, a light source module and a driver module, wherein:

the light source module and the driver module are both provided on the lamp body and electrically connected to each other, and the driver module comprises a circuit board and an inductor device, and wherein:

the inductor device comprises a winding and an inductor framework;

the inductor framework comprises a main winding part and at least two conductive welding components, wherein the main winding part is provided with a limited groove;

the main winding part is configured to fix a winding and has a connection surface facing downward, the conductive welding components are under the connection surface and at least partly cover the connection surface, and the conductive welding components are in fixed connection with the main winding part and the at least two conductive welding components are insulated from each other;

a side surface of the conductive welding components away from the connection surface is a welding bonding surface, and the conductive welding components have a wire accommodation region, wherein the wire accommodation comprises a wire groove, and the wire accommodation region is configured that a wire of the winding do not extend beyond the welding bonding surface in a case where the wire of the winding is accommodated in the wire accommodation region, wherein an end of the limited groove extends into the wire groove, and the conductive welding components cover an entirety of the connection surface, and the conductive welding components are further provided with a wire passage channel interconnecting the wire groove and the limit groove; and the winding is constituted by winding a wire with an insulating sheath, has an input wire and an output wire, and the winding is fixed on the main winding part, and the input wire and the output wire are respectively accommodated in the wire accommodation region of two of the at least two conductive welding components insulated from each other.

* * * * *